US010160164B2

(12) United States Patent
Hudson (10) Patent No.: US 10,160,164 B2
(45) Date of Patent: Dec. 25, 2018

(54) SYSTEMS AND METHODS FOR ADDITIVE MANUFACTURING OF THREE-DIMENSIONAL OBJECTS USING NEEDLE FELTING

(71) Applicant: Disney Enterprises, Inc., Burbank, CA (US)

(72) Inventor: Scott Hudson, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 957 days.

(21) Appl. No.: 14/566,766

(22) Filed: Dec. 11, 2014

(65) Prior Publication Data
US 2016/0167296 A1    Jun. 16, 2016

(51) Int. Cl.
*B29C 67/00*    (2017.01)
*B33Y 10/00*    (2015.01)
*B33Y 30/00*    (2015.01)
*B29C 64/00*    (2017.01)

(52) U.S. Cl.
CPC .......... *B29C 67/0051* (2013.01); *B29C 64/00* (2017.08); *B33Y 10/00* (2014.12); *B33Y 30/00* (2014.12)

(58) Field of Classification Search
CPC ................................................. B29C 67/0051
See application file for complete search history.

(56) References Cited

U.S. PATENT DOCUMENTS 6,381,818 B1 *  5/2002  Freeman ................ D04H 18/02
28/107

OTHER PUBLICATIONS

Hudson, Scott E., "Printing Teddy Bears: A Technique for 3D Printing of Soft Interactive Objects", Paper submitted to CHI 2014 Conference <http://chi2014.acm.org/ >, Apr. 26-May 1, 2014, 10 pages.

* cited by examiner

*Primary Examiner* — Larry W Thrower
(74) *Attorney, Agent, or Firm* — Sheppard Mullin Richter & Hampton LLP (57) ABSTRACT

A system for additive manufacturing of three-dimensional objects through felting. The system may include a composition head configured to deposit a manufacturing material comprising a strand of interlocked fibers onto a composition bed along a composition path. The composition path may define a path along which the composition head deposits the manufacturing material to form a predetermined three-dimensional object. The composition head may include a reciprocating felting needle configured to draw the manufacturing material from a material source and deposit the manufacturing material on the composition bed, and a feed lock configured to control the feed of the manufacturing material from the material source to the composition head. The system may include a controller for the composition head comprising one or more processors configured by computer-readable instructions to control the composition head to deposit the manufacturing material on the composition bed through felting.

9 Claims, 5 Drawing Sheets

SYSTEMS AND METHODS FOR ADDITIVE MANUFACTURING OF THREE-DIMENSIONAL OBJECTS USING NEEDLE FELTING

FIELD OF THE DISCLOSURE

This disclosure relates to systems and methods for additive manufacturing.

BACKGROUND

Additive manufacturing is a process that produces precise three dimensional objects. These techniques may be referred to as "3D printing" using devices typically referred to as "3D printers". In some implementations of 3D printing, a manufacturing material, such as a plastic, is heated to a liquid state and deposited onto a print bed in successive layers. Deposited material hardens and layers are added one atop another until a final geometry is created.

SUMMARY

One aspect of the disclosure relates to a system for additive manufacturing using needle felting techniques to compose soft and flexible three-dimensional objects. The composition of such object may be facilitated through the use of manufacturing material comprising a strand of interlocked fibers, such as a wool or wool blend yarn. The system herein may facilitate the composition of three dimensional objects that embody an aesthetic of soft and imprecise objects, and provides a new capability to explore the use of this class of manufacturing materials.

In some implementations the system may comprise a composition head and a controller for the composition head. The composition head may be configured to deposit a manufacturing material comprising a strand of interlocked fibers onto a composition bed along a composition path. The composition path may define a three dimensional path along which the composition head deposits the manufacturing material to form a predetermined three-dimensional object. The composition head may include a reciprocating felting needle and a feed lock. The felting needle may be configured to draw the manufacturing material from a material source and deposit the manufacturing material on the composition bed. The feed lock may be configured to control the feed of the manufacturing material from the material source to the composition head.

The controller for the composition head may comprise one or more processors configured by computer-readable instructions to control the composition head to deposit the manufacturing material on the composition bed through felting. Such deposition may result in formation of the predetermined three-dimensional object composition.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
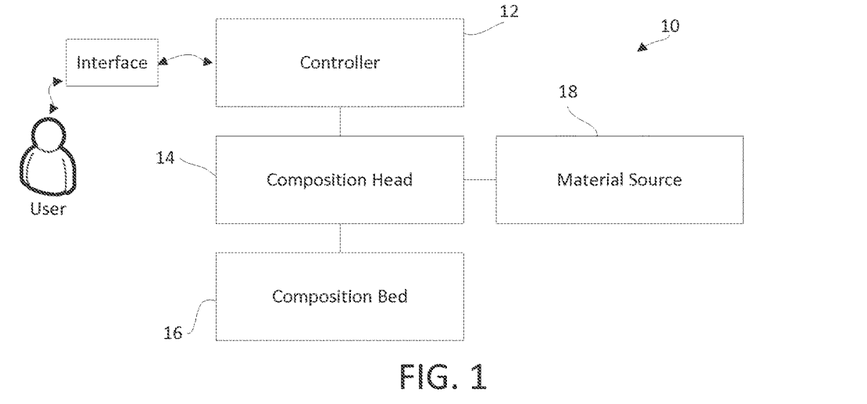
FIG. 1 illustrates a system for additive manufacturing of three-dimensional objects using felting.

FIG. 1 illustrates a system 10 for additive manufacturing of three-dimensional objects using needle felting. In some implementations, the system 10 may be suitably configured to employ a manufacturing material comprising a strand of interlocked fibers, such as a wool and/or wool blend yarn. The system 10 herein may facilitate the composition of soft and flexible three-dimensional objects based on a three-dimensional solid model of the three-dimensional object through one or more of additive manufacturing operations described herein.

The system 10 herein may comprise one or more of a controller 12, a composition head 14, a composition bed 16, a manufacturing material source 18, and/or other components. In some implementations, the manufacturing material source 18 may comprise a spool, a winding, and/or other consideration of a source of manufacturing material as described herein. The manufacturing material may be fed to the composition head 14 and deposited into the composition bed 16 through one or more operations of the system 10 described herein.

Figure 9:
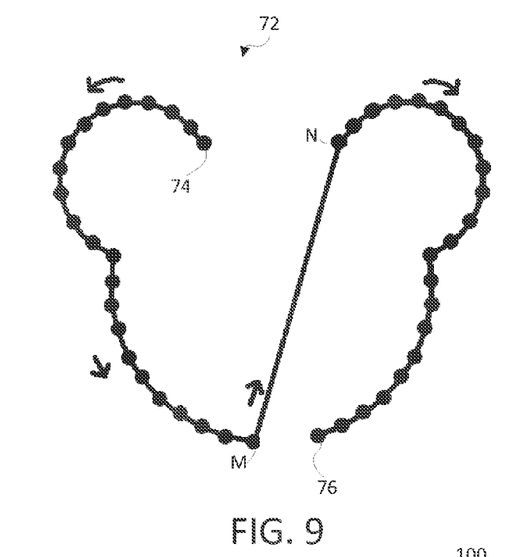
FIG. 9 illustrates an implementation of a determination of the composition path defining a three-dimensional object.

In some implementations, the composition head 14 may be configured to deposit manufacturing material comprising a strand of interlocked fibers onto the composition bed 16 along a composition path (see, e.g., path 72 in FIG. 9). The composition path may define a path along which the composition head 14 deposits the manufacturing material to form the predetermined three-dimensional object. In some implementations, the composition path may be determined, at least in part, by a solid three-dimensional computer aided design (CAD) model of the three-dimensional object. Other ways in which the composition path may be determined are described herein.

The three-dimensional composition path of the three-dimensional object may be created through a series of thin layers of manufacturing material, each representing a horizontal slice of the final geometry. Depositing material from the bottom of the object up, and bonding each layer of manufacturing material together (through needle felting described herein) a complete three-dimensional object may be formed. For each layer in this process, manufacturing material is deposited onto the composition bed 16 along a winding two-dimensional path which fills each layer. As manufacturing material is deposited along the composition path layers, the successive layers are bonded to the layers below by repeatedly piercing it with a felting needle, e.g., dragging down individual fibers from the manufacturing material into the layer(s) below and entangling them there.

In some implementations, the motion of the composition head 14 may be determined by the controller 12 controlling one or more motors, stepper motors, and/or drivers configured to translate the composition head 14 in three dimensions (e.g., a precision three-dimensional motion platform) in accordance with the composition path.

Figure 3:
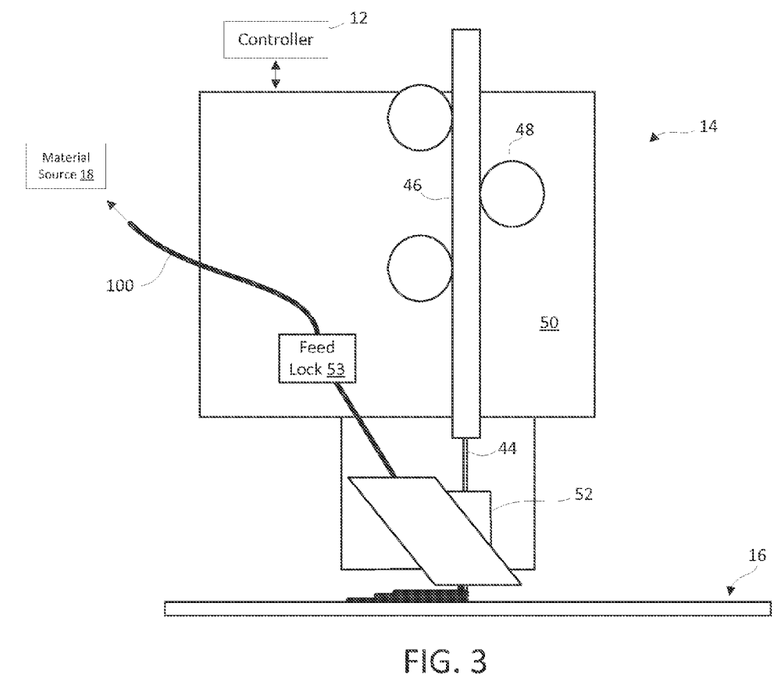
FIG. 3 illustrates an implementation of a composition head configured to deposit manufacturing material in accordance with a composition path defining the three-dimensional object.

An exemplary implementation of the composition head 14 is shown in FIG. 3. The composition head 14 may include a felting needle 44. The felting needle 44 may be engaged to a rack 46 and pinion 48 configured to facilitate reciprocal lineal motion of the felting needle 44. The reciprocating felting needle 44 may facilitate the drawing of the manufacturing material 100 from the material source 18 to deposit the manufacturing material 100 on the composition bed 16. In other implementations, one or more other electrical and/or mechanical devices may be employed to achieve the intended reciprocal motion of the felting needle 44. For example, a linear actuator may be employed. In some implementations, an end stop switch and/or other suitable component may be employed to establish a "home" or base position for the felting needle 44 and/or rack 46 as needed during reciprocation thereof.

The felting needle 44 may be felting needle as is conventionally known in the art, and/or other considerations of a needle suitable for the intended purpose(s) described herein. For example, the felting needle 44 is preferably configured to facilitate repeated piercing through the body of fibers of the manufacturing material 100 in order to draw fibers of the manufacturing material down into layers below and entangle them. In some implementations, the felting needle 44 may be a barbed needle including one or more sharp notches disposed around the needle configured to "catch" the fibers of the manufacturing material, described in more detail herein.

Figure 4:
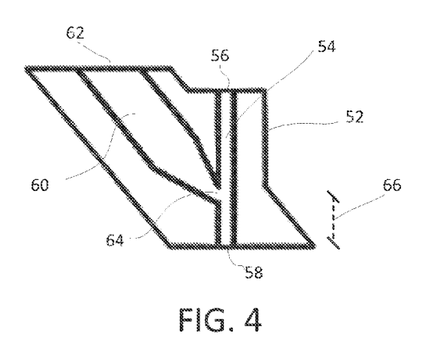
FIG. 4 illustrates a cross-sectional view of an implementation of a feed head component of the composition head.
Figure 4A:
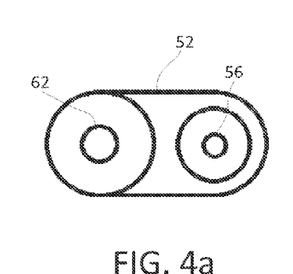
FIG. 4a illustrates a top view of the implementation of the feed head component of the composition head.

The composition head 14 may include a feed head 52 configured to guide the manufacturing material 100 into an engagement with the felting needle 44 such that the felting needle 44 can draw the manufacturing material 100 out through the feed head 52 and onto the composition bed 16 for deposition. More clearly shown in the cross sectional view of the feed head 52 in FIG. 4 and the top view of FIG. 4a, the feed head 52 may comprise a needle passage 54 and a manufacturing material passage 60 communicating there through. The needle passage 54 may include an inlet 56 and an outlet 58. The material passage 60 may include an inlet 62 and an outlet 64. The outlet 64 of the material passage 60 may intersect the needle passage 54 at a position intermediate the inlet 56 and outlet 58 of the needle passage 54, as shown in the drawings.

Manufacturing material 100 is guided through the material passage 60 and fed into the needle passage 54 via the outlet 64 of the material passage 60. By effectuating reciprocal motion of the felting needle (e.g., controlled by the controller) within the feed head 52, the manufacturing material is "caught" by the tip and/or barbed notches of the felting needle within the needle passage 54 during a stroke of the reciprocation toward the needle outlet 58. The felting needle draws the manufacturing material out through the outlet 58 of the needle passage 54 for deposition on the composition bed positioned below by piercing the composition bed a predetermined distance. The section of the needle passage 54 in which manufacturing material is "caught" by the felting needle and drawn out of the feed head 52 may be referred to as the "catch section" 66. Preferably, the construction and/or configuration of the felting needle and/or notches disposed on the felting needle are such that the manufacturing material is not caught by the felting needle when during the "upstroke" of the needle, e.g., in the direction toward the inlet 56. A more detailed description of the operations in which manufacturing material is drawn through the feed head 52 for deposition on the composition bed are provided in herein with reference made to FIG. 5-8.

Returning to FIG. 3, the composition head 14 may include a feed lock 53 configured to control the feed of the manufacturing material 100 from the material source 18 to the composition head 14. The feed lock 53 may be configured to stop the feed of manufacturing material 100 from the material source 18, apply an amount of tension to the strand of manufacturing material 100 entering the feed head 52, and/or facilitate the manufacturing material 100 being drawn freely from the material source 18 (e.g., substantially tension free). It is noted that although the feed lock 53 is currently shown located on the composition head 14, in other implementations the feed lock 53 may be disposed closer to and/or part of the material source 18.

In some implementations, the feed lock 53 may comprise two opposing grip arms or jaws (not shown) disposed on opposing sides of the manufacturing material 100 entering the feed head 52. The grip arms may be configured to stop the feed of manufacturing material 10 by activating and/or otherwise effectuating a pinching and/or fictional gripping of the manufacturing material 100 with a closure of the grip arms. An opening of the grip arms may facilitate manufacturing material drawing freely from the material source 18.

In some embodiments, the feed lock 53 may comprise a filament pulley and/or spool (not shown) configured such that the manufacturing material may be wrapped around several times. The pulley may include a clutch mechanism on its axil. In a substantially no-tension condition of the manufacturing material (e.g., drawing freely from the material source), the pulley may be configured to turn freely. In the stopped condition, the clutch on the axle of the pulley may be configured to keep the pulley from turning such that the friction of the manufacturing material wound around the pulley may provide enough tension to stop material flow.

Other considerations of a feed lock 53 suitable for the intended purpose(s) described here are also contemplated. As such, the above examples are provided for illustrative purposes only and are not intended to be limiting.

In some implementations, the pinion 48, feed head 52, feed lock 53, and/or other components of the composition head 14 may be supported and/or otherwise engaged to a support plate 50. In some implementations, the support plate 50 may provide a suitable mounting point for engaging the composition head 14 to a precision three-dimensional motion platform as described herein for facilitating three-dimensional motion of the composition head 14.

Returning to FIG. 1, the controller 12 may include one or more processors configured to execute one or more computer components for determining the composition path defining the three-dimensional object, controlling the composition head 14 to deposit the manufacturing material on the composition bed 16 through felting composition techniques, and/or perform more or less operations.

In some implementations, determining the composition path may comprise receiving a three-dimensional solid model (e.g., CAD model, a 3D scan) of a three-dimensional object, determining discrete steps for a composition path defining the three-dimensional object for translating the composition head, and/or other considerations. In some implementations, conventional solid modeling software may be suitable to provide the three-dimensional solid model. This may include software capable of providing three-dimensional solid models used in conventional additive manufacturing (e.g., "3D printing"). For example, a user may upload and/or otherwise provide a three-dimensional solid model through a user interface of the controller 12. Controlling a precision three-dimensional motion platform to translate the composition head 14 in accordance with the composition path, and controlling the composition head 14 to deposit the manufacturing material on the composition bed 16 through felting may thereafter result in formation of the predetermined three-dimensional object composition.

Figure 2:
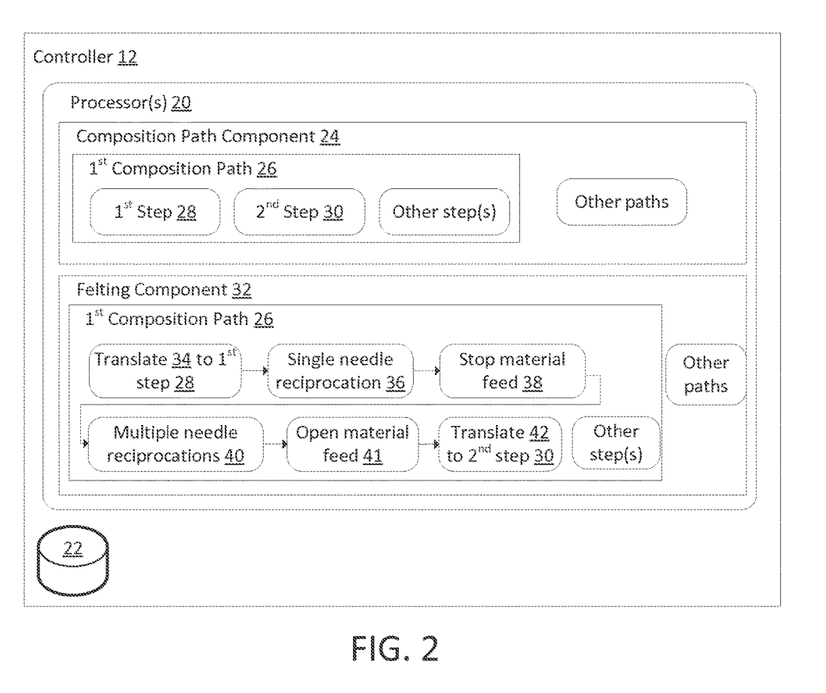
FIG. 2 illustrates an implementation of a controller for the system of FIG. 1.

Referring now to FIG. 2, an exemplary embodiment of a controller 12 used in the system 10 of FIG. 1 is shown. The controller 12 may include processor(s) 20. The computer program components may include one or more of a composition path component 26, a felting component 32, and/or other components. The controller 12 may be configured to communicate with one or more user interfaces. A user interface may include, for example, a smartphone, a laptop, a tablet computer, a desktop computer, and/or other device suitable for the intended purposes as described herein and/or other considerations. The users may access controller 12 via a user interface.

The composition path component 24 may be configured to determine the composition path defining the three-dimensional object. The determination of the composition path may be a determination as described herein, for example, determined at least in part by a three-dimensional solid model of the object received by the controller 12 (e.g., the composition path component 24), and/or other considerations. The three-dimensional solid model may be broken up into multiple 2D layers which are formed one atop another and bound together to form the final geometry of the three-dimensional object. Determining the composition path may include determining a start location of each of the layers of the three-dimensional object, determining the winding two-dimensional path which fills each layer of the solid model, determining an end location of each of the layers, and determining a path between successive layers (e.g., movement between an end location of one layer and the start location of the next layer).

In some implementations, determining the composition path may include determining discrete steps for translating the composition head along the composition path. The discrete steps may be spaced at predetermined distances along the composition path, at a distance which is selected by a user (e.g., via user interface for the controller 12), and/or other considerations. For example the spacing between discrete steps may be set by a user to 2 mm (or other distance), e.g., via a user interface for the controller 12.

As an illustrative example, the composition path component 24 may be configured to determine discrete steps for a first composition path 26 defining a three-dimensional object. The determining may include determining a first step 28, a second step 30, and/or other steps defining the first composition path 26.

The felting component 32 may be configured to control the composition head to deposit the manufacturing material on the composition bed through felting. Such deposition performed along the discrete steps of the composition path may result in formation of the predetermined three-dimensional object composition. In some implementations, the controlling of the composition head to deposit the manufacturing material on the composition bed through felting comprises the operations of: effectuating translation of the composition head to a discrete step of the composition path (e.g., via the precision three-dimensional motion platform), effectuating a single reciprocation of the felting needle to deposit an amount of the manufacturing material onto the composition bed, effectuating control of the feed lock to stop the feed of manufacturing material from the material source, effectuating multiple reciprocations of the felting needle to felt the deposited manufacturing material onto the composition bed, effectuating control of the feed lock to facilitate the feed of manufacturing material from the material source, effectuating translation of the composition head to a next discrete step of the composition path, and/or other operations.

Effectuating translation of the composition head to a discrete step of the composition path may be facilitated by a precision three-dimensional motion platform on which the composition head is disposed. A precision three-dimensional motion platform may be as described herein, and/or other considerations. In some implementations, the translations of the composition head during the composition of individual layers of the three-dimensional object may be performed with the feed lock configured to facilitate manufacturing material being drawn freely from the material source, so that manufacturing material does not get taunt during the translation and/or pull-out previously deposited material.

In some implementations, the operations of effecting a single reciprocation of the felting needle to deposit an amount of manufacturing material onto the composition bed may be performed with the feed lock configured to facilitate manufacturing material being drawn freely from the material source. In some implementations, the amount of material deposited may be equivalent to the penetration distance of the felting needle into the composition bed, described in more detail herein. This operation may facilitate an initial deposition of some amount of the manufacturing material at each discrete step, insofar that the subsequent step of felting the deposition through multiple reciprocations can be performed with the appropriate amount of manufacturing material already deposited on the composition bed. The single reciprocation may be performed such that the felting needle pierces the composition bed (and/or material deposited onto the composition bed) a distance between 4 and 8 mm (or other distance).

In some implementations, the operations of effectuating multiple reciprocations of the felting needle to felt deposited manufacturing material may be performed with the feed lock configured to stop the feed of manufacturing material from the material source. This operation may facilitate a "felting in" of the deposited amount of manufacturing material without "dragging" additional manufacturing material from the material source onto the deposition site and causing the material to "bunch up" without proper felting. The multiple reciprocations may be performed such that the felting needle pierces the composition bed (and/or material deposited onto the composition bed) a distance between 8 and 12 mm (or other distance), however may be penetrated up to 16 mm or larger.

As an illustrative example, the felting component 32 may be configured to effectuate translation 34 of the composition head to the first step 28 of the first composition path 26, effectuate a single needle reciprocation 36 at the first discrete step 28 to deposit an amount of the manufacturing material onto the composition bed, effectuate control of the feed lock to stop the feed 38 of manufacturing material from the material source, effectuate multiple reciprocations 40 of the felting needle to felt in the deposited manufacturing material onto the composition bed, effectuate control of the feed lock to facilitate the feed of manufacturing material being drawn freely 41 from the material source, effectuate translation 42 to the second step 30 of the first composition path 26, and/or perform other operations.

FIG. 5-FIG. 8 show exemplary illustrations depicting manufacturing material 100 being deposited and felted onto the composition bed 16 at a discrete step of an arbitrary composition path. The figures currently show the deposition of a free end 102 of the manufacturing material 100 onto the composition bed 16 (e.g., as may be encountered at the start of a composition process). However it is noted that the operations described herein may be the same or similar at intermediate lengths of the manufacturing material 100 as may be performed for subsequent steps along the composition path.

In some implementations, the composition bed 16 may comprise one or more of a bottom support layer 68, felting foam layer 70, a starter fiber layer 71, and/or other considerations. The bottom support layer 68 may generally comprise a rigid structural support of the composition bed 16. The felting foam layer 70 may comprise a coarse, open pore, foam rubber (and/or other suitable material) which absorbs needle punches suitably without degradation. For example the felting foam layer 70 may absorb multiple needle punches during the composition of a bottommost layer (and/or one or more successive layers) of the three-dimensional object composition. The starter fiber layer 71 may comprise a layer of felt (or other material) comprising the same or similar material as the manufacturing material 100. The starting fiber layer 71 may provide a body suitable for the first printed layer (and/or one or more subsequent printed layers) of the three-dimensional object composition to entangle with. In some implementations, the final composition may be carefully peeled away from this starting fiber layer 71, or the starting fiber layer 71 may be cut to shape and left in place for added strength as a type of backing.

Figure 5:
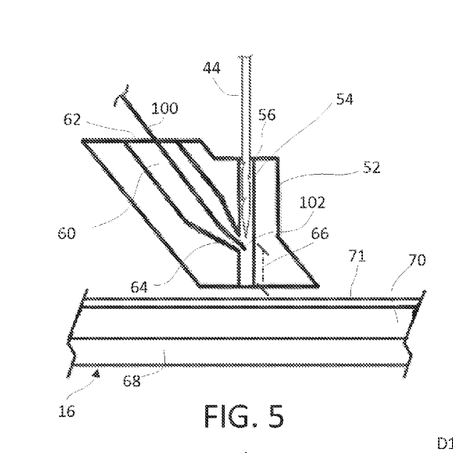
FIG. 5 shows a cross-sectional illustration of a first composition step in the additive manufacturing process in accordance with this disclosure.

FIG. 5 depicts the feed head 52 positioned at a discrete step of an arbitrary composition path over the composition bed 16. The manufacturing material 100 is fed though the material passage 60 of the feed head 52 such that the end 102 of the manufacturing material additionally feeds into the catch section 66 of the needle passage 54.

Figure 6:
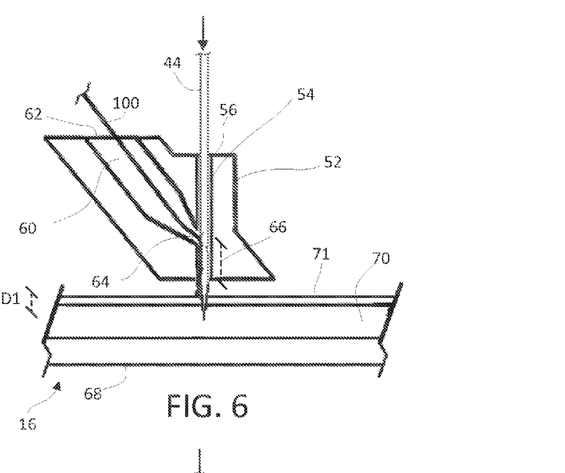
FIG. 6 shows a cross-sectional illustration of a second composition step in the additive manufacturing process in accordance with this disclosure.
Figure 7:
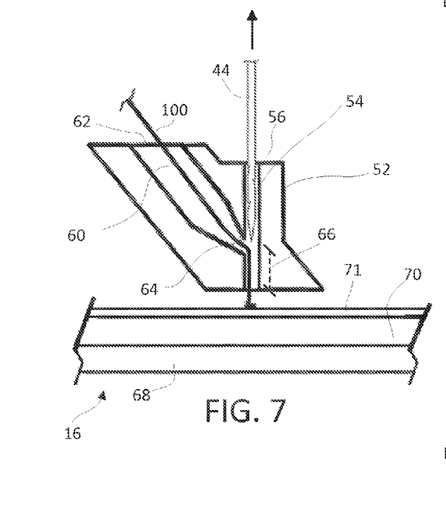
FIG. 7 shows a cross-sectional illustration of a third composition step in the additive manufacturing process in accordance with this disclosure.

FIG. 6 depicts the deposition of an amount of manufacturing material 100 onto the composition bed 16 (e.g., into an entanglement with the starter fiber layer 71). The deposition may be facilitated via a single reciprocation of the felting needle 44 wherein the felting needle 44 penetrates the composition bed 16 a first distance, D1. As mentioned previously, the first distance, D1 may be between 4 and 8 mm, for example 6 mm. As seen in FIG. 7, an amount of manufacturing material has been deposited (e.g., entangled into the starter fiber layer 71) onto the composition bed 16, thereafter the felting needle 44 is translated away from the composition bed 16 (e.g., an "upstroke").

Figure 8:
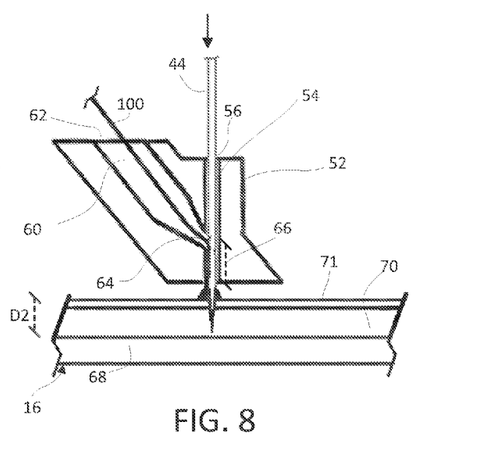
FIG. 8 shows a cross-sectional illustration of a fourth composition step in the additive manufacturing process in accordance with this disclosure.

FIG. 8 illustrates a depiction of one of multiple felting needle 44 reciprocations configured to felt-in the manufacturing material 100 deposited at the previous operation. The multiple reciprocations of the felting needle 44 to felt-in the manufacturing material may be controlled (e.g., via controller 12 of FIG. 1) such that the felting needle 44 penetrates the composition bed 16 a second distance, D2, between 8 and 12 mm, for example 10 mm. In some implementations, the multiple reciprocations may comprise at least three reciprocations.

FIG. 9 depicts an implementation of an arbitrary composition path 72. For descriptive purposes, the composition path 72 may define the head of a teddy bear. The composition path 72 may comprise one or more discrete steps, such as a starting step 74, an ending step 76, and/or one or more intermediate steps there between that define a three-dimensional object. The distance between discrete steps may be set by a user, may be predetermined, and/or may be subject to geometric restrictions of the three-dimensional object, as will be described shortly. It is noted that the depiction of composition path 72 currently shows only part of one two dimensional slice and/or layer of a total three-dimensional composition, however in actuality the composition path 72 may include additional steps along the path to "fill in" the rest of the layer, as well as subsequent layers which are deposited and bonded one atop another. As such the depiction and descriptions provided herein are for illustrative purposes of describing one or more features of the disclosure.

In some implementations, the configuration of a given composition path, such as composition path 72, may require the distance between any two consecutive discrete steps to be larger than a pre-determined and/or selected spacing. For example, composition path 72 may have a geometry which may require a relatively long translation of the composition head from one discrete step to the next. For illustrative purposes, a "relatively long" translation distance between step M and step N of the composition path 72 is shown. The determination of instances where a "relatively long" translation may occur may require special handling, as will be described shortly. Briefly, a translation distance between any two consecutive discrete steps may be determined to meet the criteria of "relatively long" if the translation distance reaches a threshold value. The threshold value may be a predetermined value, a value set by the user, and/or other considerations. For example the threshold value may be set as 4-times (or other multiple) the spacing distance input by a user. In some implementations, one or more 2D layers may have several disjointed closed/bounded regions which may result in one or more "relatively long" translation distances.

Figure 10:
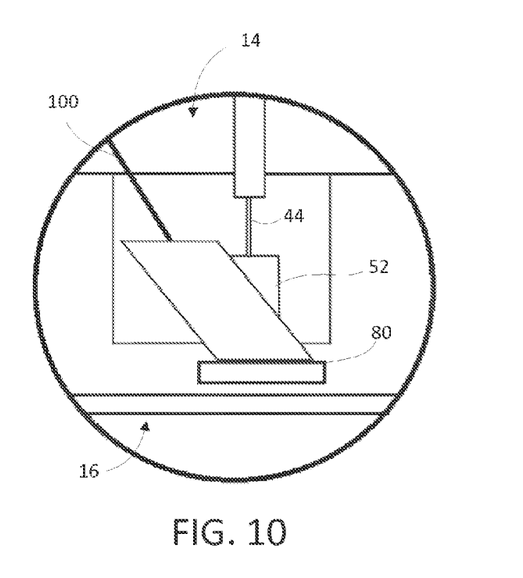
FIG. 10 illustrates partially an implementation of the compositing head including a material cutter positioned below the feed head.

Experimentation has shown that during translation of the composition head over a distance meeting the threshold value may result in manufacturing material deposited at previous steps being dragged, "pulled up" and/or substantially loosened. As such, in some implementations, as shown in FIG. 10, the composition head 14 may be configured such that the feed head 52 includes a cutting mechanism, such as cutter 80. The cutter 80 may be disposed between the feed head 52 and the composition bed 16. The cutter 80 may be configured to sever the strand of manufacturing material 100 when a translation distance of the composition head between any two consecutive discrete steps of the composition path reaches a threshold level. As such, these "relatively long" translations can be performed without pulling up a previously felted in amount of manufacturing material. At the subsequent discrete step, the free end of the newly cut portion of manufacturing material 100 may be deposited onto the composition bed 16 as described herein to continue the composition of the three-dimensional object at the subsequent step.

As such, in some implementations, referring back to FIG. 1, the controller 12 may be configured by computer-readable instructions to determine, from the generated composition path, that the distance between any two consecutive discrete steps of a composition path reaches a threshold level. Responsive to determining that a distance between any two discrete steps reaches the threshold level, effectuate, using the cutter, severance of the manufacturing material prior to translating the print head to the second of the two consecutive discrete steps.

The cutter (e.g., cutter 80 in FIG. 10) may comprise a pair of servo-actuated scissor blades, a single blade, and/or other device suitable for the intended purpose of automatically cutting the manufacturing material as described herein.

In some implementations, the system 10 described herein may be suitable to compose three dimensional object including integrated electronics and/or mechanical components. Described in more detail herein, the processes of composing three-dimensional objects through felting may facilitate the embedding a soft three-dimensional object formed by the techniques described herein with interactive devices with electronic components for sensing and display.

In some implementations, it may be possible to create interior cavities or pockets within the composition to hold components. With this approach, an interior void may be specified in the object geometry (e.g., the composition path). When the composition reaches some number of layers past the bottom of this void, the manufacturing process can be paused. Then a component can be placed in the partial or complete pocket, and the composition continued, forming layers over the top of the pocket. In some implementations, the formation of layers over the top of the pocket may be facilitated by placing a small piece of foam or other "stuffing material" (such as polyester fibers or yarn) in the void above the embedded component. Layers may be composed over the top of the pocket by felting into this support material such that the needle does not strike the embedded component.

In some implementations, it may be possible to felt over one or more types of objects for embedding. For thin wires (stranded insulated wire, solid insulated or bare wire, as well as typical through-hole component leads up to approximately 1 mm in diameter), the wire can simply be placed on top of a layer during a pause, held loosely in place by hand or with pins, and simply felted over.

In some implementations, the three-dimensional compositions may be attached to rigid objects. Attaching the composition to solid objects may be facilitated by felting in a layer of mesh material (e.g., a nylon or other material mesh) to form an interface suitable for attaching to rigid objects. For example, the mesh material embedded into a three dimensional object may be bonded to a rigid (e.g., plastic) object by suitable bonding techniques.

In some implementations, three-dimensional composition may be strengthen and/or stiffened by embedding low stretch fabric or mesh and/or other "stiffeners" into the felted composition. For example, a stiffener may include a length of plastic rod (e.g., less than 0.5 mm wide).

Returning to FIG. 1, the controller 12, user interface, and/or external resources (not shown) may be operatively linked via one or more electronic communication links. For example, such electronic communication links may be established, at least in part, via a network such as the Internet, a local area network, and/or other networks. It will be appreciated that this is not intended to be limiting, and that the scope of this disclosure includes implementations in which controller 12, user interfaces, and/or external resources may be operatively linked via some other communication media.

External resources may include sources of information, external entities participating with controller 12 (e.g., a CAD drafting service, a 3D scanner, and/or entity), and/or other resources. In some implementations, some or all of the functionality attributed herein to external resources may be provided by resources included in system 10.

Referring now to FIG. 2, the controller 12 may include electronic storage 22, one or more processors 20, and/or other components. The controller 12 may include communication lines, or ports to enable the exchange of information with a network and/or other computing platforms. Illustration of controller 12 in FIG. 2 is not intended to be limiting. The controller 12 may include a plurality of hardware, software, and/or firmware components operating together to provide the functionality attributed herein to controller 12. For example, controller 12 may be implemented by a cloud of computing platforms operating together as controller 12.

Electronic storage 22 may comprise electronic storage media that electronically stores computer readable information. The electronic storage media of electronic storage 22 may include one or both of system storage that is provided integrally (i.e., substantially non-removable) with controller 12 and/or removable storage that is removably connectable to controller 12 via, for example, a port or a drive. A port may include a USB port, a firewire port, and/or other port. A drive may include a disk drive and/or other drive. Electronic storage 22 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 22 may include one or more virtual storage resources (e.g., cloud storage, a virtual private network, and/or other virtual storage resources). Electronic storage 22 may store software algorithms, information determined by processor 20, information received from controller 12, information received from user interfaces, and/or other information that enables controller 12 to function as described herein.

Processor(s) 20 is configured to provide information processing capabilities in controller 12. As such, processor 20 may include one or more of a digital processor, an analog processor, a digital circuit designed to process information, an analog circuit designed to process information, a state machine, and/or other mechanisms for electronically processing information. Although processor 20 is shown in FIG. 2 as a single entity, this is for illustrative purposes only. In some implementations, processor 20 may include one or more processing units. These processing units may be physically located within the same device, or processor 20 may represent processing functionality of a plurality of devices operating in coordination. The processor 20 may be configured to execute components 24 and 32. Processor 20 may be configured to execute components 24 and 32 by software; hardware; firmware; some combination of software, hardware, and/or firmware; and/or other mechanisms for configuring processing capabilities on processor 20.

It should be appreciated that although components 24 and 32 are illustrated in FIG. 2 as being co-located within a single processing unit, in implementations in which processor 20 includes multiple processing units, one or more of components 24 and 32 may be located remotely from the other components. The description of the functionality provided by the different components 24 and 32 described above is for illustrative purposes, and is not intended to be limiting, as any of components 24 and 32 may provide more or less functionality than is described. For example, one or more of components 24 and 32 may be eliminated, and some or all of its functionality may be provided by other ones of components 24, 32 and/or other components. As another example, processor 20 may be configured to execute one or more additional components that may perform some or all of the functionality attributed to one of components 24 and 32.

Figure 11:
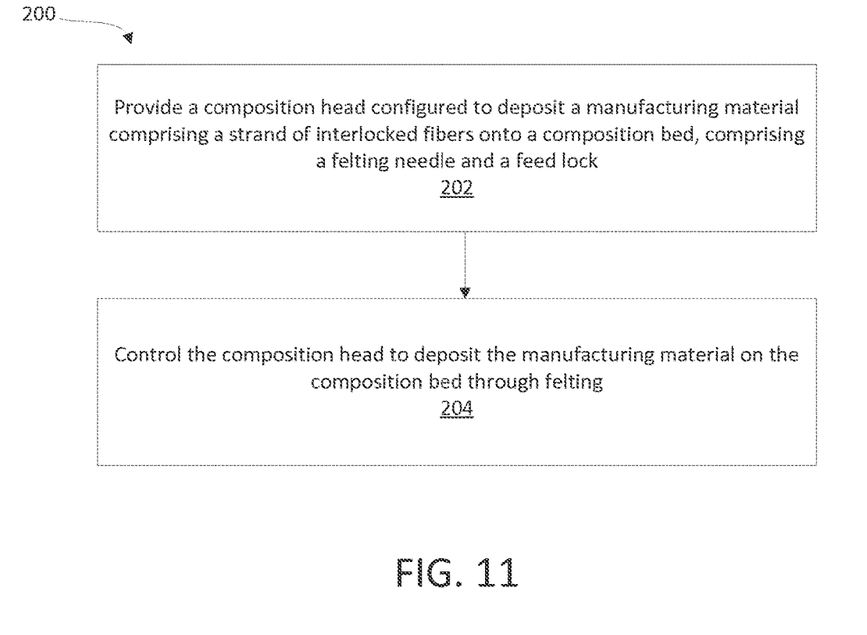
FIG. 11 illustrations an implementation of a method of additive manufacturing.

FIG. 11 illustrates a method 200 of additive manufacturing. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 3 and described below are not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information), using a precision three-dimensional motion platform, and/or one or more other components. The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

Referring now to method 200 in FIG. 11, at an operation 202, a composition head configured to deposit a manufacturing material comprising a strand of interlocked fibers onto a composition bed may be provided. The composition head may be disposed on a precision three-dimensional motion platform as described herein, and/or other considerations. The composition head may comprise a felting needle and a feed lock. In some implementations, operation 202 may be performed by a composition head the same as or similar to composition head 14 (shown in FIGS. 1 and 3 and described herein).

At an operation 204, the composition head may be controlled to deposit the manufacturing material on the composition bed through felting. In some implementations, operation 204 may be performed by a controller the same as or similar to controller 12 (shown in FIGS. 1 and 2, and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for additive manufacturing of three-dimensional objects, the system comprising:
   a composition head configured to deposit a manufacturing material comprising a strand of interlocked fibers onto a composition bed along a composition path, the composition path defining a path along which the composition head deposits the manufacturing material to form a predetermined three-dimensional object, the composition head including:
      a reciprocating felting needle configured to draw the manufacturing material from a material source and deposit the manufacturing material on the composition bed,
      a feed lock configured to control the feed of the manufacturing material from the material source to the composition head, and
      one or more motors configured to translate the composition head in three dimensions in accordance with the composition path; and,
   a controller for the composition head comprising one or more processors configured by computer-readable instructions to control the composition head to deposit the manufacturing material on the composition bed through felting, such deposition resulting in formation of the predetermined three-dimensional object composition.

2. The system of claim 1 wherein the controller is configured by computer-readable instructions to determine the composition path defining the three-dimensional object, including determining discrete steps for translating the composition head along the composition path.

3. The system of claim 2 wherein the controller is configured by computer-readable instructions such that the controlling of the composition head to deposit the manufacturing material on the composition bed through felting comprises:
   effectuating translation of the composition head to a discrete step of the composition path,
   effectuating a single reciprocation of the felting needle to deposit an amount of the manufacturing material onto the composition bed,
   effectuating control of the feed lock to stop the feed of manufacturing material from the material source,
   effectuating multiple reciprocations of the felting needle to felt the deposited manufacturing material onto the composition bed, and
   effectuating control of the feed lock to facilitate the manufacturing material being drawn freely from the material source.

4. The system of claim 3 wherein the controller is configured by computer-readable instructions such that the multiple reciprocations of the felting needle to felt the deposited manufacturing material comprises at least three reciprocations.

5. The system of claim 3 wherein the controller is configured by computer-readable instructions such that the single reciprocation of the felting needle to deposit an amount of manufacturing material penetrates the felting needle 4 to 8 mm into the composition bed.

6. The system of claim 3 wherein the controller is configured by computer-readable instructions such that the multiple reciprocations of the felting needle to felt the deposited manufacturing material onto the composition bed penetrates felting needle 8 to 12 mm into the composition bed.

7. The system of claim 3 wherein the composition head additionally comprises a cutter configured to sever the strand of manufacturing material when a translation distance of the composition head between any two consecutive discrete steps of the composition path reaches a threshold level.

8. The system of claim 7 wherein the controller is configured by computer-readable instructions to:
   determine, from the generated composition path, that the distance between any two consecutive discrete steps of the composition path reaches a threshold level;
   responsive to determining that the distance between any two discrete steps reaches a threshold level, effectuate, using the cutter, severance of the manufacturing material prior to translating the print head to the second of the two consecutive discrete steps.

9. The system of claim 1, wherein the manufacturing material is yarn comprising natural wool.

* * * * *